April 22, 1930. B. C. ROOT 1,755,899
CONDUIT CONNECTION
Filed June 7, 1926 2 Sheets-Sheet 1
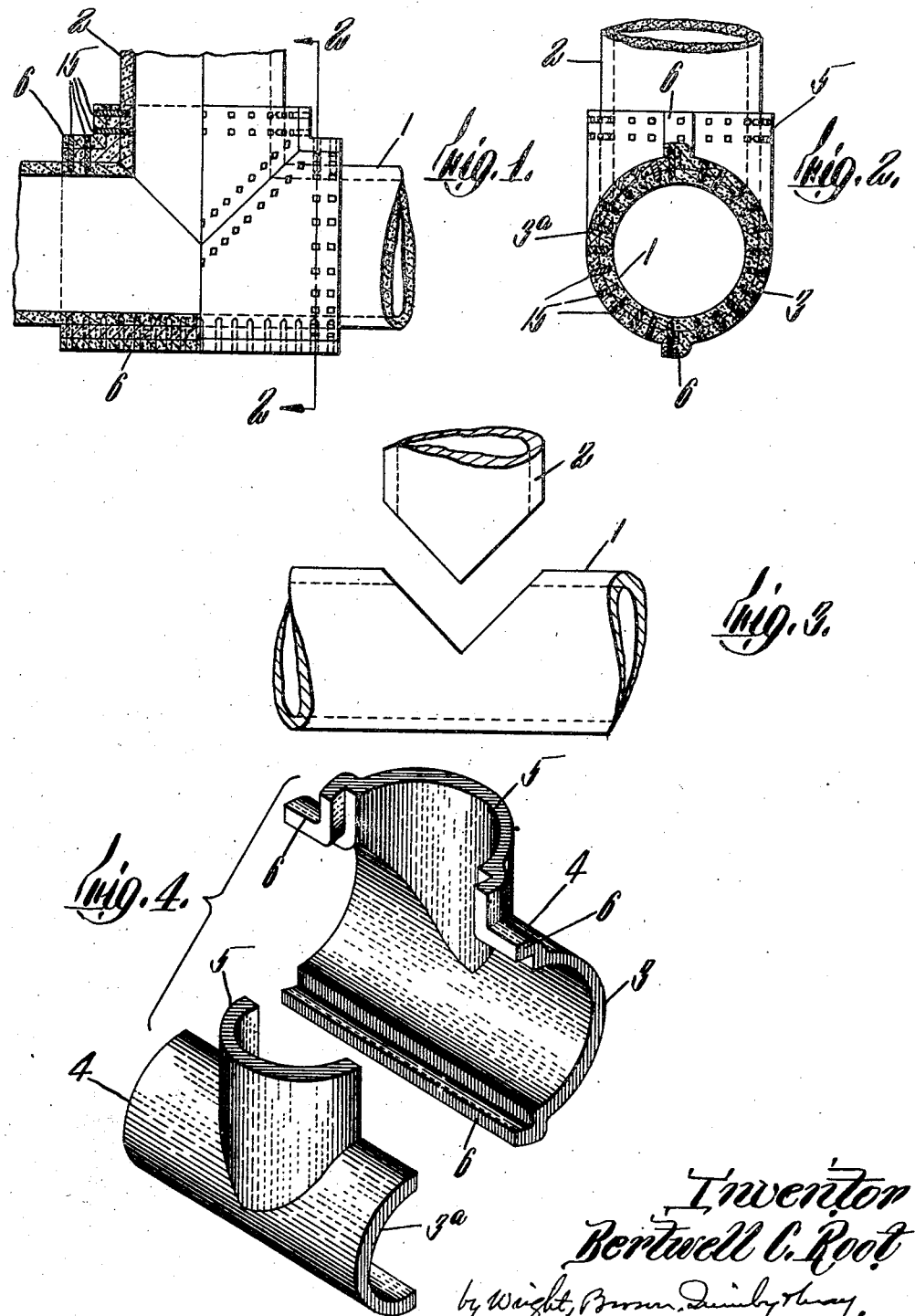

April 22, 1930.    B. C. ROOT    1,755,899
CONDUIT CONNECTION
Filed June 7, 1926    2 Sheets-Sheet 2
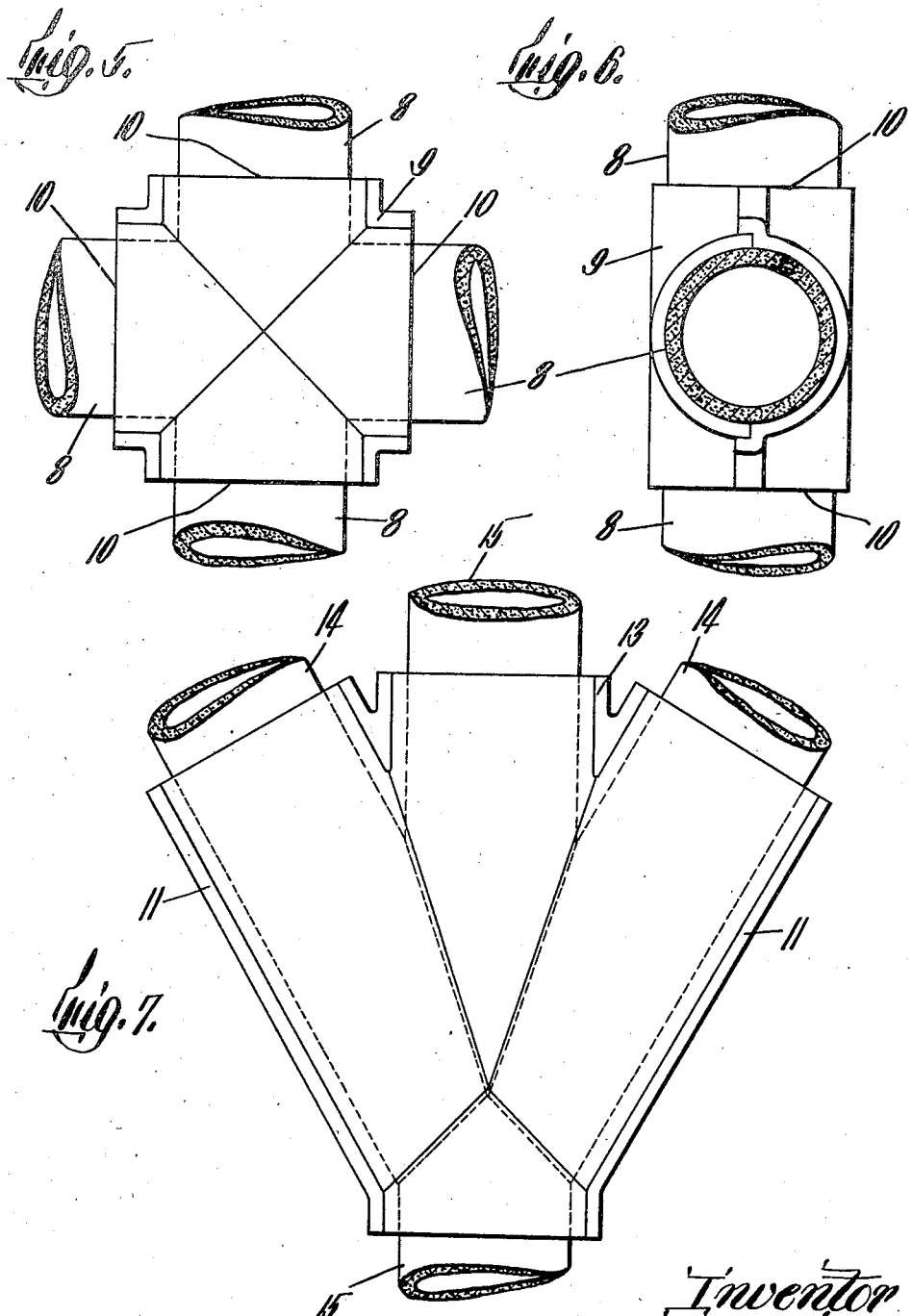

Patented Apr. 22, 1930

1,755,899

UNITED STATES PATENT OFFICE

BERTWELL C. ROOT, OF BERLIN, NEW HAMPSHIRE, ASSIGNOR TO BROWN COMPANY, OF BERLIN, NEW HAMPSHIRE, A CORPORATION OF MAINE

CONDUIT CONNECTION

Application filed June 7, 1926. Serial No. 114,269.

This invention relates to conduit connections, and relates more particularly to angular connections between conduits made of interfelted fibrous material saturated with a thermoplastic waterproofing compound, such as pitch. Such conduits now find extensive use as housings for electric cable or wiring systems, and as fluid conductors.

A conduit or tube, such as here concerned with, may be made by winding a web of cellulose pulp (e. g., mechanical, chemical, or mixed pulp) from a Fourdrinier wire or other web-forming mechanism on a mandrel, until a wall of the desired thickness has been built up, after which the conduit may be stripped from the mandrel and dried. When formed under such conditions, the several layers or convolutions of fibrous material are all sufficiently matted together, or interfelted, to yield a substantially homogeneous or non-laminated structure. The dry conduit is treated with a thermoplastic waterproofing compound of the nature of bitumen or pitch in a manner to effect a thorough and uniform saturation of the fibrous wall thereof. The waterproofing compound chosen should be liquefiable by heat at a temperature to permit penetration into the fibrous wall without, however, scorching or otherwise injuring the fibers. The waterproofing treatment also serves to strengthen and rigidify the conduit and to increase its dielectric properties.

In practice, it is frequently found necessary to lead off one or more conduits angularly from a main, as in the form of a T, Y or cross. This invention provides a simple and efficient method of making angular conduit connections which are durable, well-appearing, non-leaking, and all the parts of which are made of conduit material.

In accordance with the method of the present invention, a two-piece or split coupling having one or more angular sockets for the reception of one or more branches is moulded from superposed sheets of wet pulp to a configuration to fit nicely about the main conduit. One piece of the coupling is moulded with flanges at its contacting edges to engage over the corresponding edge portions of the other piece and to permit fasteners to be driven through the flanges into the other piece. The conduits may be assembled with and fastened to the coupling, whereupon the assembly may be treated with waterproofing material in the usual manner, to produce a waterproof, non-leaking joint.

The invention may best be understood from the following more detailed description thereof when considered in conjunction with the accompanying drawings, wherein Figure 1 represents in side view an assembled and fastened connection provided with one branch.

Figure 2 is a section on the line 2—2 of Figure 1.

Figure 3 shows a side view of the conduits conditioned for assembly.

Figure 4 illustrates in perspective a two-piece or split coupling for assembling a branch and main conduit.

Figure 5 represents a front view of an assembled cross connection.

Figure 6 is a side view of the same.

Figure 7 shows a front view of an assembled Y connection.

Referring now to Figures 1 to 4 of the drawings, at 1 is shown the portion of a tubular fibrous conduit from which it is desired to lead off a branch conduit 2. As shown in Figure 3, the conduit 1 is cut into for the reception of the branch, the form of cut herein shown being in the form of a V and intended for the reception of the branch to produce a T connection. The end of the conduit 2 is cut in the form of a V complemental with the V formed in the wall of the conduit 1.

The split coupling for this connection is shown in Figure 4, and includes a piece 3, consisting of a sleeve portion 4 and a socket portion 5 projecting rectangularly therefrom, both of which are provided at their contacting edges with flanges 6 shaped to engage nicely over the corresponding edge portions of a similar complemental piece 3ª. As stated, each of the pieces of the coupling may be formed by superposing and pressing together moist sheets of interfelted cellulosic fibers in a mould of the proper form, until they have permanently acquired the shape of the mould and have become matted together. The moulded piece may then be dried and finally trimmed and finished at its edges.

The coupling is assembled with the conduits 1 and 2, as shown in Figures 1 and 2, and the parts are fastened together with the portions 5 fitting together and forming a socket in which the branch 2 is received, and the portions 4 mating together to form a sleeve engaging about the conduit 1. Fasteners are driven through the flanges of the coupling piece 3 and through the corresponding edge portions of the piece 3ª into the conduits, also through the socket portions 5 into the conduit 2, and through the sleeve portions 4 into the conduit 1. Preferably wooden pegs 15, similar to those sometimes used in pegging shoes, are employed as fasteners. To facilitate pegging, starting apertures of a depth less than the length of the pegs may be formed through the coupling pieces and into the conduits, after which the pegs may be inserted into the apertures and driven into the unperforated material. Or, where available, a shoe-pegging machine, which both forms the hole and drives the peg, may be employed. A connection thus made is strong, durable and well-appearing, is not subject to loosening even when a considerable force is applied thereto, and in effect is equivalent to an integral construction. The fastened assembly is treated with a thermoplastic waterproofing material, e. g., pitch, in the usual manner to effect a uniform and thorough saturation of the conduit material. The waterproofing material further serves to bond the parts together at their junctures, so that the resultant connection is non-leaking.

If desired, the coupling may be moulded to a form suitable for the connection of a larger number of conduits. Thus, in Figures 5 and 6, I have shown a coupling which may be employed to connect conduits in the form of a cross. The ends of all the conduits 8, as shown, are similarly cut in the form of a V and assembled with a two-piece or split coupling 9, shaped in the form of a cross connection. The coupling consists of four sockets 10, each of which serves for the reception of the end of a conduit.

In Figure 7, the split coupling is illustrated as having sockets 11 for the reception of branches 14 symmetrically but non-rectangularly, at an angle to the axis of sleeve portion 13 fitting about the end portions of main conduits. The ends of the mains 15 are complementally cut with the ends of the branches 14, and are assembled with the coupling as shown, to form a Y connection. In each case, the parts are fastened together after assembly, and the assembly is finally treated with waterproofing material.

While I have shown and described certain specific embodiments of connections, it is obvious that these are illustrative only and are subject to change and modification without, however, departing from the spirit or scope of invention as defined by the appended claims.

I do not herein claim broadly a method of joining fibrous conduits or conduit parts, which comprises pegging conduits or conduit parts together and then saturating the same with waterproofing material, as this is disclosed and claimed in my application, Serial No. 108,673, filed May 12, 1926.

What I claim is:

1. A non-leaking fibrous conduit connection comprising a conduit having an opening for angular communication with another conduit, a split coupling surrounding said conduit and having a projecting socket portion for the reception of another conduit at said opening, another conduit held within said socket portion, and wooden pegs passed through and holding the parts of said connection together, said connection being saturated with a thermoplastic waterproofing material which serves to bond the parts together at their junctures.

2. A fibrous conduit connection comprising a conduit having an opening for angular communication with another conduit, a two-piece split coupling surrounding said conduit and having a projecting socket portion for the reception of said other conduit at said opening, one of the pieces of said coupling having flanges at its contacting edges, which flanges engage over the corresponding edge portions of the other piece, another conduit held within said socket portion, and fasteners passed through the flanges of said one piece into the other and through said pieces into the conduits.

3. A non-leaking fibrous conduit connection comprising a conduit having an opening for angular communication with another conduit, a two-piece split coupling surrounding said conduit and having a projecting socket portion for the reception of said other conduit, one of the pieces of said coupling having flanges at its contacting edges, engaging over the corresponding edge portions of the other piece, another conduit held within said socket portion, and fasteners passed through the flanges of said one piece into the other and through said pieces into the conduits, said connection being saturated with a thermoplastic waterproofing material which serves to bond the parts together at their junctures.

4. A non-leaking fibrous conduit connection comprising a coupling having a plurality of sockets extending angularly therefrom for the reception of conduits, a plurality of conduits fitted within said sockets, and wooden pegs passed through the several parts of said connection and holding the same together, said connection being saturated with a thermoplastic waterproofing compound which serves to bond the parts together at their junctures.

In testimony whereof I have affixed my signature.

BERTWELL C. ROOT.